US007481866B2

(12) United States Patent
MacGillivray et al.

(10) Patent No.: US 7,481,866 B2
(45) Date of Patent: Jan. 27, 2009

(54) GAS STORAGE MATERIALS AND DEVICES

(75) Inventors: Leonard R. MacGillivray, Iowa City, IA (US); Giannis S. Papaefstathiou, Ilioupoli Attikis (GR)

(73) Assignee: University of Iowa Research Foundation, Iowa City, IA (US)

( * ) Notice: Subject to any disclaimer, the term of this patent is extended or adjusted under 35 U.S.C. 154(b) by 883 days.

(21) Appl. No.: 10/465,535

(22) Filed: Jun. 19, 2003

(65) Prior Publication Data

US 2009/0000474 A1 Jan. 1, 2009

Related U.S. Application Data

(60) Provisional application No. 60/389,828, filed on Jun. 19, 2002.

(51) Int. Cl.
*B01J 20/22* (2006.01)
*C01B 3/00* (2006.01)
(52) U.S. Cl. .......................................... 95/90; 502/401
(58) Field of Classification Search ................... 96/108; 95/90, 116, 127, 130, 138, 141, 142, 143; 429/12; 502/400, 401; 252/181.1
See application file for complete search history.

(56) References Cited

U.S. PATENT DOCUMENTS

| 4,359,327 | A | 11/1982 | Armand et al. | ............... 95/116 |
| 6,491,740 | B1 * | 12/2002 | Wang et al. | ..................... 95/90 |
| 2003/0004364 | A1 * | 1/2003 | Yaghi et al. | .................... 556/46 |
| 2003/0148165 | A1 * | 8/2003 | Muller et al. | .................. 429/34 |
| 2003/0222023 | A1 * | 12/2003 | Mueller et al. | ............... 210/656 |
| 2006/0252641 | A1 * | 11/2006 | Yaghi et al. | ................. 502/401 |
| 2007/0068389 | A1 * | 3/2007 | Yaghi | ........................... 96/148 |
| 2007/0082816 | A1 * | 4/2007 | Yang et al. | .................. 502/417 |

OTHER PUBLICATIONS

Internet Document: Abstract for "An Inverted Metal-Organic Framework with Compartmentalized Cavities Constructed by Using an Organic Bridging Unit Derived from the Solid State", Jul. 2007.*
"Zeolite", Hawley's Condensed Chemical Dictionary, 14th Edition, John Wiley & Sons, Inc. 2002.*
Papaefstathiou, G., et al., "An Inverted Metal-Organic Framework with Compartmentalized Cavities Constructed by Using an Organic Bridging unit Derived from the Solid State", Angew. Chem. Int. Ed., 41, (Jun. 12, 2002), 2070-2073.*
Abrahams, Brendan F., et al., "A new type of infinite 3D polymeric network containing 4-connected, peripherally-linked metalloporphyrin building blocks", *Journal of the American Chemical Society*, 113(9), (Apr. 24, 1991),3606-3607.
Batten, Stuart R., et al., "An alternative to interpenetration whereby nets with large windows may achieve satisfactory space filling", *Chem. Commun.*, (2000),1095-1096.
Batten, Stuart R., et al., "Interpenetrating Nets: Ordered, Periodic Entanglement", *Angewandte Chemie International Edition*, 37(11), (Jun. 19, 1998),1460-1494.
Baxter, Paul, et al., "Multicomponent Self-Assembly: Spontaneous Formation of a Cylindrical Complex from Five Ligands and Six Metal Ions", *Angew. Chem. Int. Ed. Engl.*, vol. 32, No. 1, (1993),69-72.
Baxter, Paul N., et al., "The Design and Generation of Inorganic Cylindrical Cage Architectures by Metal-Ion-Directed multicomponent Self-Assembly", *Chemistry—A European Journal*, 5(1), (Jan. 4, 1999),102-112.
Biradha, Kumar, et al., "Covalent and noncovalent interpenetrating planar networks in the crystal of {[Ni(4,4'-bipyridine)2(NO3)2?2pyrene]n", *Chem. Commun.*, 14, (1999),1327-1328.
Biradha, Kumar, et al., "Open Square-Grid Coordination Polymers of the Dimension 20x20 A: Remarkably Stable and Crystalline Solids Even after Guest Removal", *Angewandte Chemie*, 39(21), (Nov. 3, 2000),3843-3845.
Biradha, Kumar, et al., "Open Square-Grid Coordination Polymers of the Dimensions 20x20 A: Remarkably Stable and Crystalline Solids Even after Guest Removal", *Angewandte Chemie*, 112(21), (Nov. 3, 2000),4001-4003.
Blake, Alexander J., et al., "In situ ligand synthesis and construction of an unprecedented three-dimensional array with silver(i): a new approach to inorganic crystal engineering", *Chem. Commun.*, (1997),1675-1676.
Carlucci, Lucia, et al., "Self-assembly of a three-dimensional network from two-dimensional layers via metallic spacers: the (3,4)-connected frame of [Ag3(hmt)2][ClO4]3 2H2O (hmt=hexamethylenetetramine)", *Chem. Commun.*, (1997),631-632.
Cheung, Eugene, et al., "Latent chemical behavior revealed in the crystalline state: novel photochemistry of a cis-9-decalyl aryl ketone", *Chem. Commun.*, (2000),2309-2310.
Choi, Kihang, et al., "Selective Anion Binding by a Macrocycle with Convergent Hydrogen Bonding Functionality", *Journal of the American Chemical Society*, 123(10),(Mar. 14, 2001),2456-2457.
Cotton, F A., et al., "Supramolecular structures based on dimetal units: simultaneous utilization of equatorial and axial connections", *Chem. Commun.*, (2001),11-12.
Eddaoudi, M, et al., "Molecular Chemistry: Secondary Building Units as a Basis for the Design of Highly Porous and Robust Metal-Organic Carboxylate Frameworks", *Acc. Chem. Res.*, 34(4), (2001),319-330.
Fyfe, M C., et al., "Synthetic Supramolecular Chemistry", *Acc. Chem. Res.*, 30(10), (1997),393-401.
Hagrman, Pamela J., et al., "Organic-Inorganic Hybrid Materials: From Simple Coordination Polymers to Organodiamine-Templated Molybdenum Oxides", *Angewandte Chemie International Edition*, 38(18), (Sep. 17, 1999),2638-2684.

(Continued)

*Primary Examiner*—Frank M Lawrence
(74) *Attorney, Agent, or Firm*—Viksnins Harris & Padys PLLP (57) ABSTRACT

The invention provides a porous metal-organic framework that can be used to store gases, such as hydrogen. Also provided is metal-organic framework comprising bifunctional metallic bridging groups and organic nodes having three or more points of connection, wherein the framework has one or more cavities suitable for containing one or more storage gas molecules. The invention further provides a metal-organic framework comprising organic functional groups directed into the one or more cavities that are capable of reacting with a storage gas.

41 Claims, 8 Drawing Sheets

OTHER PUBLICATIONS

Hagrman, Pamela J., et al., "Organisch-anorganische Hybridmaterialien: von einfachen Koordinationspolmeren zu Molybdanoxiden mit Organodiamin-Templaten", *Angewandte Chemie*, 111(18), (Sep. 17, 1999),2798-2848.

Iyoda, Masahiko, et al., "Synthesis of Tris(9-fluorenylidene)cyclopropane Dianion and Related Dianions: [3]Radialenes with Novel Electronic Properties", *Angew. Chem. Int. Ed. Engl.*, 32, (1993),89-90.

Keller, Steven W., et al., "A Two-Dimensional Geometric Coordination Polymer Containing Pentagonal Cavities", *Journal of the American Chemical Society*, 121(26), (Jul. 7, 1999),6306-6307.

Kepert, Cameron J., et al., "Zeolite-like crystal structure of an empty microporous molecular framework", *Chem. Commun.*, (1999),375-376.

Kiang, Y H., et al., "Variable Pore Size, Variable Chemical Functionality, and an Example of Reactivity within Porous Phenylacetylene Silver Salts", *Journal of the American Chemical Society*, 121(36), (Sep. 15, 1999),8204-8215.

Kruk, M, et al., "Gas Absorption Characterization of Ordered Organic-Inorganic Nanocomposite Materials", *Chem. Mater.*, 13(10), (2001),3169-3183.

Lei, Xinjian, et al., "Clusters as Ligands—Large Assemblies of Transition Metal Clusters", *European Journal of Inorganic Chemistry*, 1998(12), (Dec. 1998),1835-1846.

Li, Hailian, et al., "Design and synthesis of an exceptionally stable and highly porous metal-organic framework", *Nature*, 402(6759), (Nov. 18, 1999),217-328.

Lim, Myong H., et al., "Synthesis and Characterization of a Reactive Vinyl-Functionalized MCM-41: Probing the Internal Pore Structure by a Bromination Reaction", *Journal of the American Chemical Society*, 119(17), (Apr. 30, 1997),4090-4091.

Lo, Samuel M., et al., "Solvothermal Synthesis of a Stable Coordination Polymer with Copper-I-Copper-II Dimer Units: [Cu4{1,4-C6H4(COO)2}3(4,4'-bipy)2]n", *Journal of the American Chemical Society*, 122(26), (Jul. 5, 2000),6293-6294.

Macgillivray, Leonard R., et al., "Design and Self-Assembly of Cavity-Containing Rectangular Grids", *Journal of the American Chemical Society*, 120(11), (Mar. 25, 1998),2676-2677.

MacGillivray, Leonard R., "From engineering crystals to engineering molecules: emergent consequences of controlling reactivity in the solid state using linear templates", *CrystEngComm*, 4(7), (2002),37-41.

MacGillivray, Leonard R., et al., "Supremolecular Control of Reactivity in the Solid State Using Linear Molecular Templates", *Journal of the American Chemical Society*, 122(32), (Aug. 16, 2000),7817-7818.

Min, Kil S., et al., "Self-Assembly and Selective Guest Binding of Three-Dimensional Open-Framework Solids from a Macrocyclic Complex as a Trifunctional Metal Building Block", *Chem. Eur. J.*, 7(1), (Jan. 5, 2001),303-313.

Miyasaka, Hitoshi, et al., "Hexagonal Layered Materials Composed of [M2(O2CCf3)4] (M=Ru and Rh) Donors and TCNQ Acceptors", *Angewandte Chemie*, 38(21), (Nov. 3, 2000),3831-3835.

Miyasaka, Hitoshi, "Hexagonal Layered Materials Composed of [M2(O2CCF3)4] (M=Ru and Rh) Donors and TCNQ Acceptors", *Angewandte Chemie*, 112(21), (Nov. 3, 2000),3989-3993.

Moulton, Brian, et al., "From Molecules to Crystals Engineering: Supramolecular Isomerism and Polymorphism in Network Solids", *Chem. Rev.*, 101(6), (2001),1629-1658.

Moulton, Brian, et al., "Periodic Tiling of Pentagons: The First Example of a Two-Dimensional 5 3/4 net", *Journal of the American Chemical Society*, 123(37), (Sep. 19, 2001),9224-9225.

Papefstathiou, G., et al., "An inverted Metal-Organic Framework with Compartmentalized Cavities Constructed by Using an Organic Bridging Unit Derived from the Solid State", *Angew. Chem. Int. Ed.*, (2002),2070-2073.

Papaaefstathiou, Giannis S., et al., "Exploiting modularity in template-controlled synthesis: a new linear template to direct reactivity within discrete hydrogen-bonded molecular assemblies in the solid state", *Chem. Commun.*, (2001),2462-2463.

Ranford, John D., et al., "Thermal Conversion of a Helical Coil into a Three-Dimensional Chiral Framework", *Angewandte Chemie International Edition*, 38(23), Dec. 3, 1999),3498-3501.

Real, Jose A., et al., "Crystal structure and magnetic properties of bis(isothiocyanato)bis(pyrazine)iron polymer, a 2D sheetlike polymer", *Inorg. Chem.*, 30(12), (1991),2701-2704.

Renslo, Adam R., et al., "Molecular Recognition with Introverted Functionality", Angewandte Chemie, 112(18), (Sep. 15, 2000),3419-3421.

Rudkevich, Dmitry M., et al., "Capped Biscalix[4]arene-Zn-Porphyrin: Metalloreceptor with a Rigid Cavity", *J. Org. Chem.*, 60(20), (1995),6585-6587.

Schlapbach, L, et al., "Hydrogen-storage materials for mobile applications", *Nature*, 414, (Nov. 15, 2001),353-358.

Schmidt, G M., "Photodimerization in the Solid State", *Pure & Applied Chemistry*, 47(4), (1971),647-678.

Selvam, P, et al., "Recent Advances in Processing and Characterization of Periodic Mesoporous MCM-41 Silicate Molecular Sieves", *Ind. Eng. Chem. Res.*, 40(15), (2001),3237-3261.

Seo, Jung S., et al., "A homochiral metal-organic porous material for enantioselective separation and catalysis", *Nature*, 404(6781), (Apr. 27, 2000),982-986.

Smith, Joseph V., "Topochemistry of zeolites and related materials. 1. Topology and geometry", *Chem. Rev.*, 88(1), (1988),149-182.

Tong, Ming-Liang, et al., "Two- and three-dimensional non-interpenetrating open-networks self-assembled by 4-hexamethylenetetramine (hmt). Syntheses and structures of [Ag2(4-hmt)(SO4)(H2O)]?4H2O and [Ag2(4-hmt)(-O2CMe)]MeCO2?4.5H2O", *Chem. Commun.*, 6, (1999),561-562.

Van Der Sluis, P, et al., "Bypass: an effective method for the refinement of crystal structures containing disordered solvent regions", *Acta Cryst., A46*, (1990),194-201.

Venkataraman, D, et al., "Zeolite-like Behavior of a Coordination Network", *Journal of the American Chemical Society*, 177(46), (Nov. 22, 1995),11600-11601.

Wesemann, J L., et al., "Incorporation of Ru2(O2C(CH2)6CH3)4 into Extended Chains: Interaction of Ru2(O2C(CH2)6CH3)4 with Pyrazine, 4-Cyanopyridine, TCNE, and p-Benzoquinone", *Inorg. Chem.*, 36(15), (1997),3258-3267.

Zaworotko, Michael J., "Nanoporous Structures by Design", *Angewandte Chemie*, 39(17), (Sep. 1, 2000),3052-3054.

* cited by examiner

GAS STORAGE MATERIALS AND DEVICES

RELATED APPLICATION

This application claims priority under 35 U.S.C. 119(e) from U.S. Provisional Application Ser. No. 60/389,828 filed Jun. 19, 2002, which application is incorporated herein by reference.

GOVERNMENT FUNDING

The invention described herein was made with government support under Grant Number DMR-0133138 awarded by the National Science Foundation. The United States Government has certain rights in the invention.

BACKGROUND OF THE INVENTION

There is considerable interest in chemical systems that store and release gases such as hydrogen. Such systems are expected to find large-scale use as hydrogen fuel cells in a variety of applications. To date, two main chemical approaches have been employed to store hydrogen (See Schlapbach, L., Züttel, A. *Nature* 2001, 414, 353). The first approach involves adsorption of hydrogen within low-density porous materials. In this approach, carbonaceous (e.g. nanotubes) and silicon-rich (e.g. zeolites) solids have been shown to exhibit appreciable sorption capacities. The second approach involves absorption of hydrogen by reactive high-density materials such as metal hydrides. In this process, a hydride interacts with hydrogen to cause dissociation of the molecule. Two hydrogen atoms recombine to facilitate the desorption process.

Although the above approaches are promising for the development of viable hydrogen storage systems, each has significant drawbacks. Despite offering a promise of low-density, lightweight storage materials, adsorption systems have been based on structures that are either not well defined (e.g. nanostructured carbon) or possess hydrophilic surfaces that do not interact favorably with hydrogen (e.g. zeolite). High pressures are also typically required to facilitate the adsorption process. In the case of metal hydrides, the high densities of such solids have been deemed unacceptable for many practical purposes.

Additionally, U.S. Pat. No. 4,359,327 reports the use of certain specific cyclophanes to store hydrogen. However, the use of this technology is limited because the cyclophane must be dissolved in a liquid (e.g. organic solvent) to facilitate the absorption process.

Porous crystalline solids that employ metal-organic components as building blocks, where a rigid, linear organic bridge propagates the coordination geometry of a metal node in one- (1D), two- (2D), or three- (3D) dimensions, are attracting much interest. (Recent representative examples include J. S. Seo, et al., *Nature* 2000, 404, 982-986; S. M.-F. Lo, et al., *J. Am. Chem. Soc.* 2000, 122, 6293-6294; H. Li, et al., *Nature* 1999, 402, 276-279; B. Moulton, et al., *Chem. Commun.* 1999, 1327-1328; S. W. Keller, S. Lopez, *J. Am. Chem. Soc.* 1999, 121, 6306-6307; J. D. Ranford, et al., *Angew. Chem.* 1999, 111, 3707-3710 and *Angew. Chem. Int. Ed.* 1999, 38, 3498-3501; L. R. MacGillivray, et al., *J. Am. Chem. Soc.* 1998, 120, 2676-2677; M. J. Zaworotko, *Angew. Chem.* 2000, 112, 3180-3182 and *Angew. Chem. Int. Ed. Engl.* 2000, 39, 3052-3054; D. Venkataraman, et al., *J. Am. Chem. Soc.* 1995, 117, 11600-11601; C. J. Kepert, M. J. Rosseinsky, *Chem. Commun.* 1999, 375-376; K. Biradha, et al., *Angew. Chem.* 2000, 112, 4001-4003; and *Angew. Chem. Int. Ed. Engl.* 2000, 39, 3843-3845).

Such metal-organic frameworks (MOFs) are designed to exhibit properties that mimic, and improve upon, more conventional porous solids such as zeolites (J. V. Smith, *Chem. Rev.* 1988, 88, 149-182) and mesoporous materials (MCMs) (Selvam, S. K. Bhatia, C. G. Sonwane, *Ind. Eng. Chem. Res.* 2001, 40, 3237-3261).

Many porous MOFs, however, have fallen short, in contrast to zeolites and MCMs, as robust porous solids. (M. J. Zaworotko, *Angew. Chem.* 2000, 112, 3180-3182; *Angew. Chem. Int. Ed. Engl.* 2000, 39, 3052-3054; S. R. Batten, R. Robson, *Angew. Chem.* 1998, 110, 1558-1595; *Angew. Chem, Int. Ed. Engl.* 1998, 37, 1460-1494). Interpenetration and framework fragility have hampered progress such that host cavities tend to self-include while guest removal often results in a collapse of host structure. (S. R. Batten, R. Robson, *Angew. Chem.* 1998, 110, 1558-1595; *Angew. Chem. Int. Ed. Engl.* 1998, 37, 1460-1494; M. J. Zaworotko, *Angew. Chem.* 2000, 112, 3180-3182; *Angew. Chem. Int. Ed. Engl.* 2000, 39, 3052-3054).

Recently, however, such problems of interpenetration and framework fragility have been largely circumvented using metal clusters, as secondary building units (SBUs), for host design (M. Eddoudi, et al., *Acc. Chem. Res.* 2001, 34, 319-330). SBUs (e.g. metal-carboxylates) reduce the likelihood of interpenetration owing to their large sizes which can preclude filling of void spaces, producing stable, porous solids able to support inclusion and catalysis (J. S. Seo, et al., *Nature* 2000, 404, 982-986; S. M.-F. Lo, et al., *J. Am. Chem. Soc.* 2000, 122, 6293-6294; H. Li, et al., *Nature* 1999, 402, 276-279).

Although SBUs have been successfully employed for the construction of MOFs with stable pores, it can be difficult, in contrast to MCMs to line the interiors of such solids with organic groups since an elaborate covalent synthesis of a linear organic bridge is often required to introduce simple (e.g. —Me) and diverse (e.g. chiral) functionalities. (Selvam, S. K. Bhatia, C. G. Sonwane, *Ind. Eng. Chem. Res.* 2001, 40, 3237-3261; MCMs are readily functionalized with organic groups by post-synthetic graphting: See: M. H. Lim, et al., *J. Am. Chem. Soc.* 1997, 119, 4090-409).

Accordingly, there is currently a need for new chemical systems that can be used to store gases (e.g. hydrogen). Such systems would be useful in numerous applications, such as, for example, in the manufacture of fuel cells.

SUMMARY OF THE INVENTION

A novel group of MOFs have been prepared by inverting the structural role of the SBU and linear organic bridge such that the SBU serves as a linear bridge and the organic ligand serves as a node. (For studies involving metal linkers as linear bridges, see: K. S. Min, M. P. Suh, *Chem. Eur. J.* 2001, 7, 303-313; Y.-H. Kiang, et al., *J. Am. Chem. Soc.* 1999, 121, 8204-8215; L. Carlucci, et al., *Chem. Commun.* 1997, 631-632; M.-L. Tong, et al., *Chem. Commun.* 1999, 561-562; B. F. Abrahams, et al., *J. Am. Chem. Soc.* 1991, 113, 3606-3607). Typically in this design, the bonds of the SBU that support the framework are minimized (i.e. two) such that the remaining coordination sites of the SBU may be filled with organic ligands that decorate the interior of the framework. Moreover, such an inverted metal-organic framework (IMOF) enables the second sphere of a SBU to line the walls of a host, in contrast to a covalent synthesis, supramolecularly where convergent terminal groups may be tailored to define structure and recognition properties of the solid. (M. C. T. Fyfe, J. F. Stoddart, *Acc. Chem. Res.* 1997, 30, 393-401; A. R. Renslo, J.

Rebek, Jr., *Angew. Chem.* 2000, 112, 3419-3421; *Angew. Chem. Int. Ed. Engl.* 2000, 39, 3281-3283; K. Choi, A. D. Hamilton, *J. Am. Chem. Soc.* 2001, 123, 2456-2457).

Applicant has discovered a porous metal-organic framework that can be used to store gases such as hydrogen. Accordingly, the invention provides a metal-organic framework comprising bifunctional metallic bridging groups and organic nodes having three or more points of connection, wherein the framework has one or more cavities suitable for containing one or more storage gas molecules.

The invention also provides a metal-organic framework of the invention comprising organic functional groups directed into the one or more cavities that are capable of reacting with a storage gas.

The invention also provides a gas storage cell comprising a metal-organic framework of the invention.

The invention also provides a fuel storage cell comprising a metal-organic framework of the invention.

The invention also provides a method for storing a gas comprising contacting the metal organic framework of the invention with the gas under conditions suitable for the gas to enter the cavities of the framework.

The invention further provides a method for storing a gas comprising contacting the metal organic framework of the invention, which includes organic functional groups directed into, or lining the cavities of the metal-organic framework, with the gas under conditions suitable for the gas to enter the cavities of the framework and react with the organic groups so as to become fixed to the organic groups.

The invention further provides a metal-organic framework comprising bifunctional metallic bridging groups and organic nodes having three or more points of connection, wherein the framework has one or more cavities suitable for containing one or more storage gas molecules; and each metallic bridging group comprises copper; and each organic node is 1,2,3-tris(4-pyridyl)cyclopropane, bis(4-pyridyl)cyclobutane, tetrakis(4-pyridyl)cyclobutane, pentakis(4-pyridyl)cyclopentane, hexakis(4-pyridyl)cyclohexane, or hexakis(4-pyridyl)benzene; and the volume of each cavity is from about 20 cubic angstroms to about 2000 cubic angstroms.

Additionally provided is a method for preparing a metal-organic framework of the invention comprising reacting metallic bridging groups and organic nodes having three or more possible points of connection in a suitable solvent to provide the metal-organic framework.

The invention also provides novel synthetic processes and intermediates disclosed herein that are useful for preparing a metal-organic framework of the invention.

DETAILED DESCRIPTION OF THE INVENTION

The following definitions are used, unless otherwise described.

The term "metal-organic framework" means a solid material made up of bifunctional metal containing bridging groups that are linked to organic groups (or nodes) having three or more points of connection. The metal-organic frameworks of the invention have cavities that are large enough to contain a storage gas molecule.

The term "bifunctional metallic bridging group" means a transition metal containing compound or complex that has two sites available for linking to organic groups (nodes). Typically, the bifunctional metallic bridging group has a bonding arrangement that is greater than or equal to 60° (rather than convergent). In one embodiment, the bifunctional metallic bridging group provides a linear bridge. In one embodiment, the bifunctional metallic bridging group can contain a first row transition metal such as, for example, copper. The term bifunctional metallic bridging group includes carboxylate dinuclear complexes or paddle-wheel complexes, such as those described by Lei, X., et al., *Eur. J. Inorg. Chem.* 1998, 1835-1836. Examples of linear metallic bridging groups include [$Cu(O_2CCH_3)_2(H_2O)_2$], [$Cu(O_2CCH=CH_2)_2(H_2O)_2$], [$Cu(O_2CC(CH_3)=CH_2)_2(H_2O)_2$] [$Cu(O_2CC\equiv CH)_2(H_2O)_2$], and [$Cu(O_2CCH_2C\equiv CH)_2(H_2O)_2$].

One particular bifunctional metallic bridging group is a compound of the formula [$Cu(O_2CR)(L)_2$], wherein R is ($C_1$-$C_6$)alkyl, ($C_2$-$C_6$)alkenyl, ($C_2$-$C_6$)alkynyl, aryl, hydroxy, ($C_1$-$C_6$)alkanoyl, or amino; L is $H_2O$, $R_aOH$, amino, or pyridyl; and $R_a$ is hydrogen, ($C_1$-$C_6$)alkyl, ($C_2$-$C_6$)alkenyl, ($C_2$-$C_6$)alkynyl, aryl, or ($C_1$-$C_6$)alkanoyl.

The term "organic node having three or more points of connection" includes any organic molecule having three or more functional groups capable of forming either an electrostatic or a coordinate covalent bond with the metal of the linear metallic bridging group, to provide a framework with suitable cavities. Typically, the organic node is not planar. Examples of organic nodes include 1,2,3-tris(4-pyridyl)cyclopropane, bis(4-pyridyl)cyclobutane, tetrakis(4-pyridyl)cyclobutane, pentakis(4-pyridyl)cyclopentane, hexakis(4-pyridyl)cyclohexane, and hexakis(4-pyridyl)benzene. In one embodiment, each organic node has at least four points of connection. In another embodiment, each organic node has four points of connection.

The term "storage gas molecule" includes any gas molecule that can be stored in a framework of the invention. For example, the term includes mono-atomic gases such as helium, neon, argon, krypton, xenon, and radon, di-atomic gases such as hydrogen, oxygen and nitrogen, and poly-atomic gases such as methane, ethane, propane, butane, and related halocarbons (i.e., freons). In one embodiment, the storage gas is radioactive.

The term "cavity suitable for containing one or more storage gas molecules" means a pore or void space within the metal-organic framework that is large enough to accommodate a storage gas molecule. The size of the cavity will vary depending on the application for the framework and on the size of the gas molecule(s) to be stored. For example, the size of the cavity can typically range from about 20 cubic angstroms to about 2000 cubic angstroms, although larger and smaller volumes are possible. In one embodiment, the volume of each cavity is from about 50 cubic angstroms to about 1000 cubic angstroms. In another embodiment, the volume of each cavity is greater than 20 cubic angstroms. In another embodiment, the volume of each cavity is less than about 2000 cubic angstroms.

The metal-organic frameworks of the present invention may be used in gas storage cells. As used herein, the term "gas storage cell" or "fuel storage cell" includes, but is not limited to, structures, containers or assemblies for storage of gas or fuels, such as fuel cells. One or more of the metal-organic frameworks of the present invention may be enclosed, surrounded or otherwise part of an assembly, container or structure which also contains components necessary for storage of gas or fuel, including but not limited to openings and outlets, channels, apertures, flow outputs and inputs, and flow channels. The gas storage cells may be used for hydrogen production in general, or hydrogen-oxygen fuel cells, or other electrochemical applications.

The following specific values for radicals, substituents, and ranges, are for illustration only; they do not exclude other defined values or other values within defined ranges for the radicals and substituents. Specifically, $(C_1-C_6)$alkyl can be methyl, ethyl, propyl, isopropyl, butyl, iso-butyl, sec-butyl, pentyl, 3-pentyl, or hexyl; $(C_2-C_6)$alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl; $(C_2-C_6)$alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; $(C_1-C_6)$alkanoyl can be acetyl, propanoyl or butanoyl; and aryl can be phenyl, indenyl, or naphthyl.

According to one aspect of the invention, the metal-organic framework includes organic functional groups (e.g. C=C and C≡C groups) and/or metal-organic groups (e.g. clusters) and/or inorganic groups (e.g. $PR_3$) directed into, or lining the cavities of the metal-organic framework. Such groups are typically capable of reacting with the storage gas to fix the gas within the cavity either permanently or temporarily. In one embodiment of the invention the organic group reacts with a gas such as hydrogen, nitrogen or oxygen to hold the gas in the cavity, and then subsequently releases the gas, for example, by reversal of the reaction. In another embodiment of the invention, the organic group reacts with the gas and permanently fixes the gas in the cavity. In one preferred embodiment, each linear metallic bridging group is [Cu$(O_2CCH_3)_2(H_2O)_2$], and each organic node is tetrakis(4-pyridyl)cyclobutane. In another preferred embodiment, each linear metallic bridging group is selected from [Cu$(O_2CCH=CH_2)_2(H_2O)_2$], [Cu$(O_2CC(CH_3)=CH_2)_2(H_2O)_2$] [Cu$(O_2CC≡CH)_2(H_2O)_2$], and [Cu$(O_2CCH_2C≡CH)_2(H_2O)_2$], and each organic node is tetrakis(4-pyridyl)cyclobutane. In another preferred embodiment, each linear metallic bridging group is [Cu$(O_2CC(CH_3)=CH_2)_2(H_2O)_2$] and each organic node is tetrakis(4-pyridyl)cyclobutane.

In addition to use for gas storage, the metal-organic frameworks of the invention can also be used for removing gas contaminants. For example, the frameworks of the invention can be used to capture and contain radioactive gases.

Figure 1:
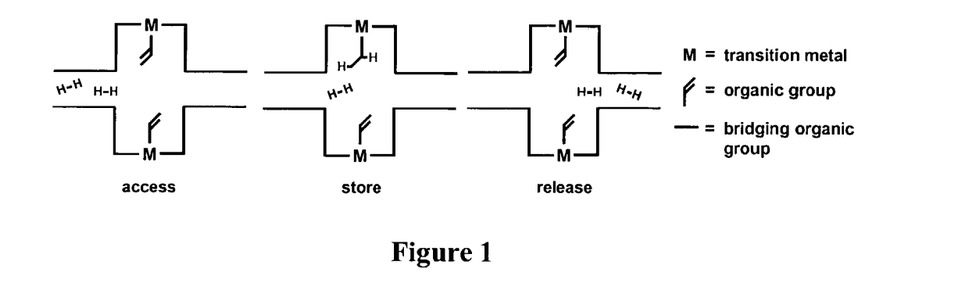
FIG. 1 illustrates the storage and release of a gas (e.g. hydrogen) through dissociation and re-association of the atoms of the molecule.

One aspect of the invention provides a metal-organic framework that is a crystalline solid capable of storing a gas such as hydrogen. The metal-organic framework of the invention typically has two structural features that permit the solid to capture and release the gas. First, the framework possesses internal cavities or pores of a size and shape suitable for entrapping the gas molecule. Such an encapsulating system may, in principle, possess pores that, similar to a traditional porous crystalline solid such as a zeolite, are accessible in one-, two-, or three-dimensions. Second, the cavities or pores of the framework, in contrast to a zeolite, possess walls that can be decorated with functionality that reacts reversibly with the gas. Such a reaction is anticipated to facilitate storage and release of the gas (e.g. hydrogen) through dissociation and re-association of the atoms of the molecule, respectively, as illustrated in FIG. 1.

The frameworks of the invention circumvent problems of high pressure, high density, and surface incompatibilities by using a metal-organic framework (MOF) as a reactive, low-density storage material for gasses such as hydrogen. The frameworks include transition-metal-ions assembled with organic ligands that bridge the metals in one-, two-, or three-dimensions. Moreover, by using an appropriate bridge, MOFs, similar to zeolites, typically can be engineered to exhibit porous structures of very low densities (e.g. 0.59 mg/m$^3$). In contrast to zeolites, however, the pores of MOFs typically may be lined with reactive metal and organic groups. Owing to the ability of unsaturated transition-metal-ions and organic groups (e.g. C=C, or C≡C) to react with gasses such as hydrogen, the cavities of MOFs typically may be designed to store and release hydrogen gas.

The ability of a framework of the invention to capture gas molecules can be determined by gas adsorption studies (for example, see: Kruk, M., Jaroniec, M. *Chem. Mater.*, 2001, 13, 3169).

The metal-organic frameworks of the invention can be prepared using synthetic procedures similar to those described in Papaefstathiou, G. S., MacGillivray, L. R. *Angew. Chem. Int. Ed. Engl.* 2002, 41, 2070. The metal-organic frameworks of the invention can also be prepared using procedures similar to those described in the Examples below. The invention also provides novel synthetic methods and intermediates described herein.

For example, the invention provides a method for preparing a metal-organic framework of the invention comprising reacting a compound of the formula [Cu$(O_2CR)(L)_2$], wherein R is $(C_1-C_6)$alkyl, $(C_2-C_6)$alkenyl, $(C_2-C_6)$alkynyl, aryl, hydroxy, $(C_1-C_6)$alkanoyl, or amino; L is $H_2O$, $R_aOH$, amino, or pyridyl; and $R_a$ is hydrogen, $(C_1-C_6)$alkyl, $(C_2-C_6)$alkenyl, $(C_2-C_6)$alkynyl, aryl, or $(C_1-C_6)$alkanoyl, with an organic node having 3 or more points of connection (e.g., 1,2,3-tris(4-pyridyl)cyclopropane, bis(4-pyridyl)cyclobutane, tetrakis(4-pyridyl)cyclobutane, pentakis(4-pyridyl)cyclopentane, hexakis(4-pyridyl)cyclohexane, and hexakis(4-pyridyl)benzene), to provide the metal-organic framework of the invention. The invention also provides a metal-organic framework prepared by this process.

The invention will now be illustrated by the following non-limiting Examples.

EXAMPLES

Example I

Introduction

Figure 2:
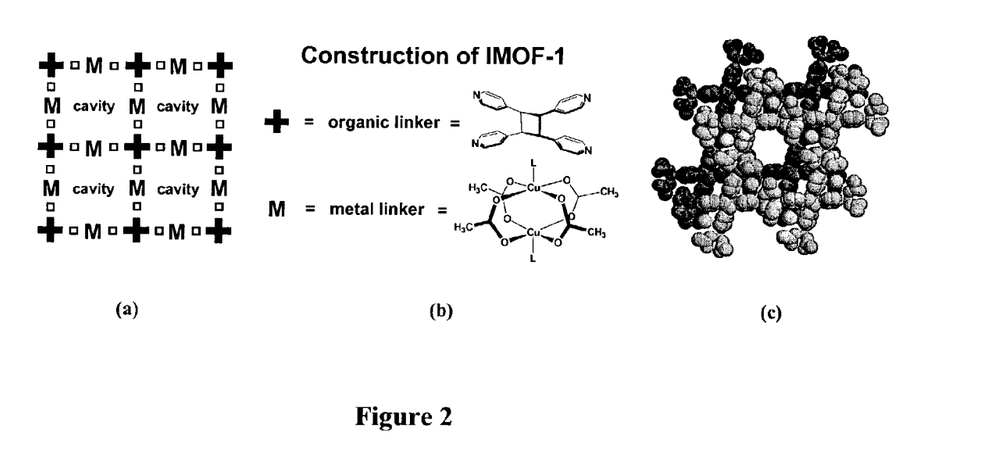
FIG. 2 illustrates (a) a schematic representation of the framework, (b) design strategy involving the metal and inorganic components, and (c) space-filling representation of the X-ray crystal structure (i.e. —$CH_3$ groups) directed into the pores (size: 10 Å) of the solid, for the permanently porous framework of the invention prepared in Example 1 below [$Cu_4(4,4\text{-tpcb})(CO_2CH_3)_8]_\infty$.

Below, we describe the results of a strategy for the construction of such a porous IMOF that employs a molecule derived from a template-directed (L. R. MacGillivray, *Cryst. Eng. Commun.* 2002, 7, 1-5; G. S. Papaefstathiou, et al., *Chem. Commun.* 2001, 2462-2463; L. R. MacGillivray, et al., *J. Am. Chem. Soc.* 2000, 122, 7817-7818) solid-state [2+2] photodimerization (G. M. J Schmidt, *Pure Appl. Chem.* 1971, 27, 647-678) as the node (FIG. 2). Owing to the presence of divergent and multiple Lewis-base functionality, we anticipated that the product of this solid-state approach, rctt-tetrakis (4-pyridyl)cyclobutane) (4,4'-tpcb) (A. J. Blake, et al., *Chem. Commun.* 1997, 1675-1676, upon reaction with the Cu-paddle-wheel complex $[Cu_2(O_2CR)_4L_2]$ would serve as a 4-connected node, propagating the dimetal complex, as a linear SBU through axial coordination, within a porous 2D IMOF. (For studies involving paddle-wheel complexes as linear bridges in extended frameworks, see: B. Moulton, et al., *J. Am. Chem. Soc.* 2001, 123, 9224-9225; F. A. Cotton, et al., *Chem. Commun.* 2001, 11-12; S. R. Batten, et al., *Chem. Commun.* 2000, 1095-1096; H. Miyasaka, et al., *Angew. Chem.* 2000, 112, 3989-3993; *Angew. Chem. Int. Ed. Engl.* 2000, 39, 3831-3835; J. L. Wesemann, M. H. Chisholm, *Inorg. Chem.* 1997, 36, 3258-3267, and references therein), B. Moulton, M. J. Zaworotko, *Chem. Rev.* 2001, 101, 1629-1658; P. J. Hagrman, et al., *Angew. Chem.* 1999, 111, 2798-2848; *Angew. Chem. Int. Ed. Engl.* 1999, 38, 2638-2684).

Figure 3:
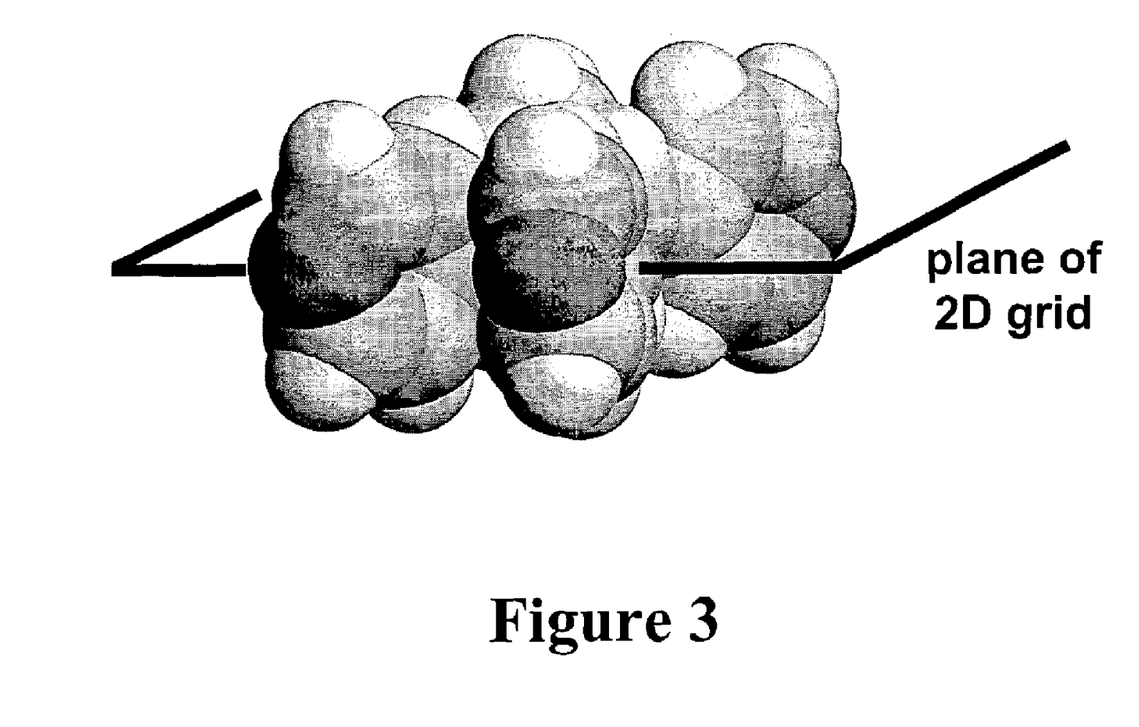
FIG. 3. The orientation of the pyridyl groups (space-filling representation) orthogonal to the plane of the 2D framework.

Moreover, in contrast to a planar organic node (e.g. 4,4'-bipyridine) (2D frameworks based on paddle-wheel complexes involving multitopic ligands that bridge by way of axial positions have involved planar linkers (see Fyfe and Stoddart, *Acc. Chem. Res.* 1997, 30, 393-401)), the ligand derived from the solid-state synthesis was anticipated to produce cavities with deepened interiors owing to enforced twisting of the pyridyl groups with respect to the cyclobutane rings which would orient the pyridyls orthogonal with respect to the plane of the 2D framework (FIG. 3). That the R-groups of the SBU may be readily modified (F. A. Cotton, R. A. Walton, *Multiple Bonds Between Metal Atoms*, 2$^{nd}$ Ed.; Oxford University Press: Oxford, UK, 1993) would provide a ready means to decorate the walls of the deepened cavities with organic functional groups.

Experimental Section

Compound 1-3 Benzene

A solution of $[Cu(O_2CCH_3)_2(H_2O)_2]$ (0.06 g) and 4,4'-tpcb (0.025 g) in methanol (15 mL) was layered with benzene (25 mL) at room temperature. Upon standing, green crystals of 1.3 benzene grew within 3 weeks and were isolated in 75% yield by way of filtration. IR (KBr pellets): $\tilde{v}$=1630 (s), 1610 (s), 1579 (sh, br), 1428 (s, br), 1346 (m), 1223 (m), 1071 (w), 1022 (m), 835 (m), 682 (m), 527 (m), 565 (m) cm$^{-1}$. Crystal data for 1.3 benzene: monoclinic, C2/m, a=14.354(3), b=27.238(5), c=8.064(2) Å, β=93.56(3)°, V=3147.0(11) Å$^3$, 2θ=45°, Mo$_{K\alpha}$ radiation (λ=0.71070 Å) for Z=2 and R=0.037. Crystal data for the heated sample of 1:triclinic, space group P1, a=8.002(2), b=13.956(3), c=15.409(3) Å, α=64.33(3)°, β=88.01(3)°, γ=83.39(3)°, V=1540.3(5) Å$^3$, 2θ=40°, Mo$_{K\alpha}$ radiation (λ=0.71070 Å) for Z=1 and R=0.128. The crystal data for 1.3 benzene and the heated sample of 1 were measured on a Nonius Kappa CCD single-crystal X-ray diffractometer at 100K. After anisotropic refinement of all non-hydrogen atoms, aromatic, methyl, and methine hydrogen atoms were placed in idealized positions and allowed to ride on the atom to which they are attached. The cyclobutane moieties in both 1.3 benzene and the heated sample of 1 were observed to lie disordered across two positions. Correspondingly, ring carbon atoms were refined with fixed site occupancies of 0.50/0.50 and 0.55/0.45, respectively. The disordered guest molecules of 1.3 benzene were disordered in a manner consistent with benzene. The atoms were treated as carbon atoms and refined with isotropic thermal parameters and fixed site occupancies. The mosaic nature of the heated sample of 1 made accurate integration of the reflection data difficult, precluding the possibility of an accurate structure with 2θ>40°. All crystallographic calculations were conducted using SHELXL-97[28] locally implemented on an IBM compatible pentium-based PC. CCDC-172946 (1.3 benzene) and CCDC-172947 (1) contains the supplementary crystallographic data for this paper. These data can be obtained free of charge via ww.ccdc.cam.ac.uk/conts/retrieving.html (or from the Cambridge Crystallographic Data Centre, 12, Union Road, Cambridge, CB21EZ, UK; fax: (+44)1223-336-033; or deposit@ccdc.cam.ac.uk).

Discussion

Figure 4:
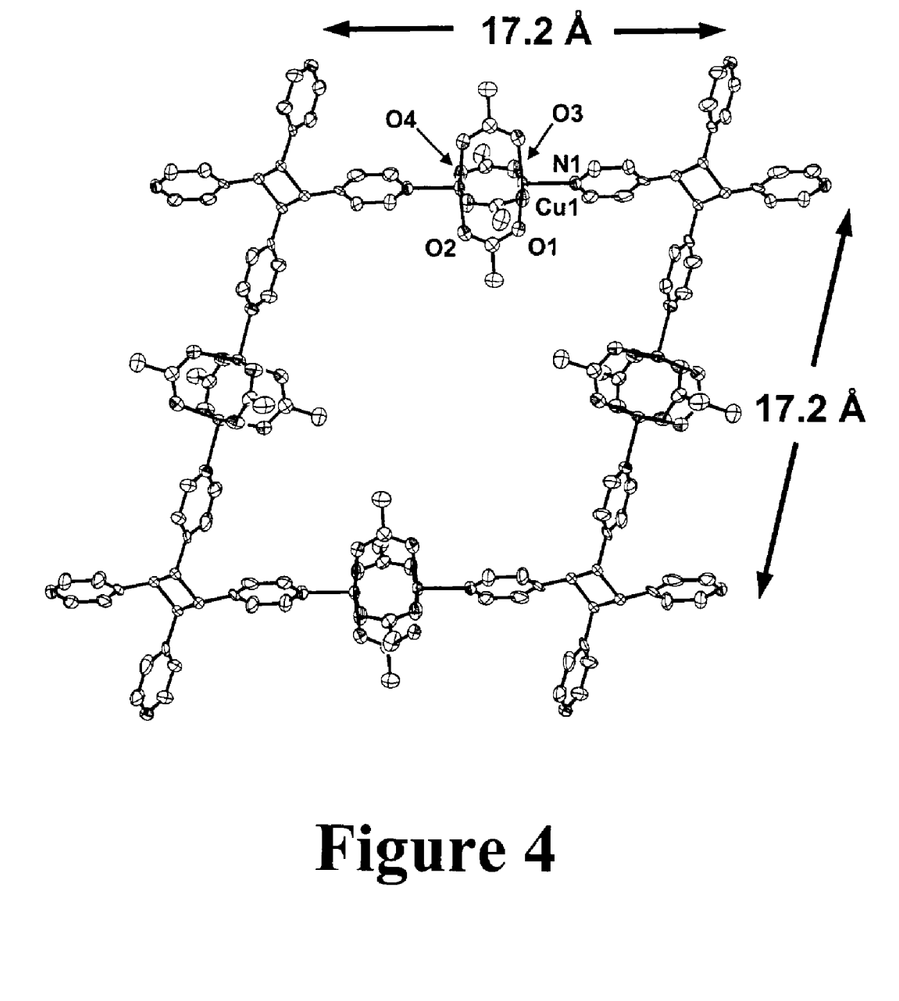
FIG. 4. ORTEP perspective of 1. Selected interatomic distances [Å]; Cu1-N1 2.148(3), Cu1-O1 1.971(3), Cu1-O2 1.980(3), Cu1-O3 1.968(2), Cu1-O4 1.965(2), Cu1 . . . Cu1a 2.600(1).

When $[Cu(O_2CCH_3)_2(H_2O)_2]$ (0.06 g) and 4,4'-tpcb (0.025 g) in methanol (15 mL) was layered with benzene (25 mL), green crystals of 1.3(benzene) grew within a period of approximately 3 weeks (yield: 75%). The formulation of 1.3(benzene) was confirmed by single-crystal X-ray diffraction (FIG. 4), X-ray powder diffraction, and thermal analysis.

The components assemble to form a porous 2D IMOF. Each 4,4'-tpcb unit, each of which sits around a crystallographic center of inversion, is surrounded by four paddle-wheel complexes, each of which is bisected by a mirror plane, such that the organic unit serves as a 4-connected vertices. As anticipated, the pyridyl rings are twisted approximately orthogonal with respect to the cyclobutane ring (dihedral angle: 139.8°) such that the pyridyl groups 'thicken' the 2D framework. (For recent studies involving paddle-wheel complexes as linear bridges in extended frameworks, see: B. Moulton, et al., *J. Am. Chem. Soc.* 2001, 123, 9224-9225; F. A. Cotton, et al., *Chem. Commun.* 2001, 11-12; S. R. Batten, et al., *Chem. Commun.* 2000, 1095-1096; H. Miyasaka, et al., *Angew. Chem.* 2000, 112, 3989-3993; *Angew. Chem. Int. Ed. Engl.* 2000, 39, 3831-3835; J. L. Wesemann, M. H. Chisholm, *Inorg. Chem.* 1997, 36, 3258-3267, and references therein.) (For 2D frameworks based on paddle-wheel complexes involving multitopic ligands that bridge by way of axial positions have involved planar linkers, see Fyfe and Stoddart, *Acc. Chem. Res.*, 1997, 30, 393-401.)

As a consequence of the assembly process, a 2D IMOF with very large rhombic cavities of dimensions of about 17.2× 17.2×5.0 Å and corner angles of about 75° and 105° is formed. Owing to the ability of 4,4'-tpcb to propagate the SBU within a (4,4)-framework, 1 may be regarded a novel inverted analog of those cavity-containing rhombic- and square-grid frameworks designed using linear bipyridines and transition-metal ions (B. Moulton, M. J. Zaworotko, *Chem. Rev.* 2001, 101, 1629-1658; P. J. Hagrman, et al., *Angew. Chem.* 1999, 111, 2798-2848; *Angew. Chem. Int. Ed. Engl.* 1999, 38, 2638-2684). The cavity of 1 is larger than most metal-(4,4'-bipyridine) rhombic- and square-grid frameworks (dimensions 12.0×12.0 Å) (B. Moulton, M. J. Zaworotko, *Chem. Rev.* 2001, 101, 1629-1658; P. J. Hagrman, et al., *Angew. Chem.* 1999, 111, 2798-2848; *Angew. Chem. Int. Ed. Engl.* 1999, 38, 2638-2684) and compares favorably with a metal-bipyridine square grid, [{Ni(4,4'-bis(4-pyridyl) biphenyl)$_2$ (NO$_3$)$_2$}$_n$] (dimensions of about 20.0×20.0 Å), designed using a lengthened linear bridge (K. Biradha, et al., *Angew. Chem.* 2000, 112, 4001-4003; *Angew. Chem. Int. Ed. Engl.* 2000, 39, 3843-3845).

Figure 5:
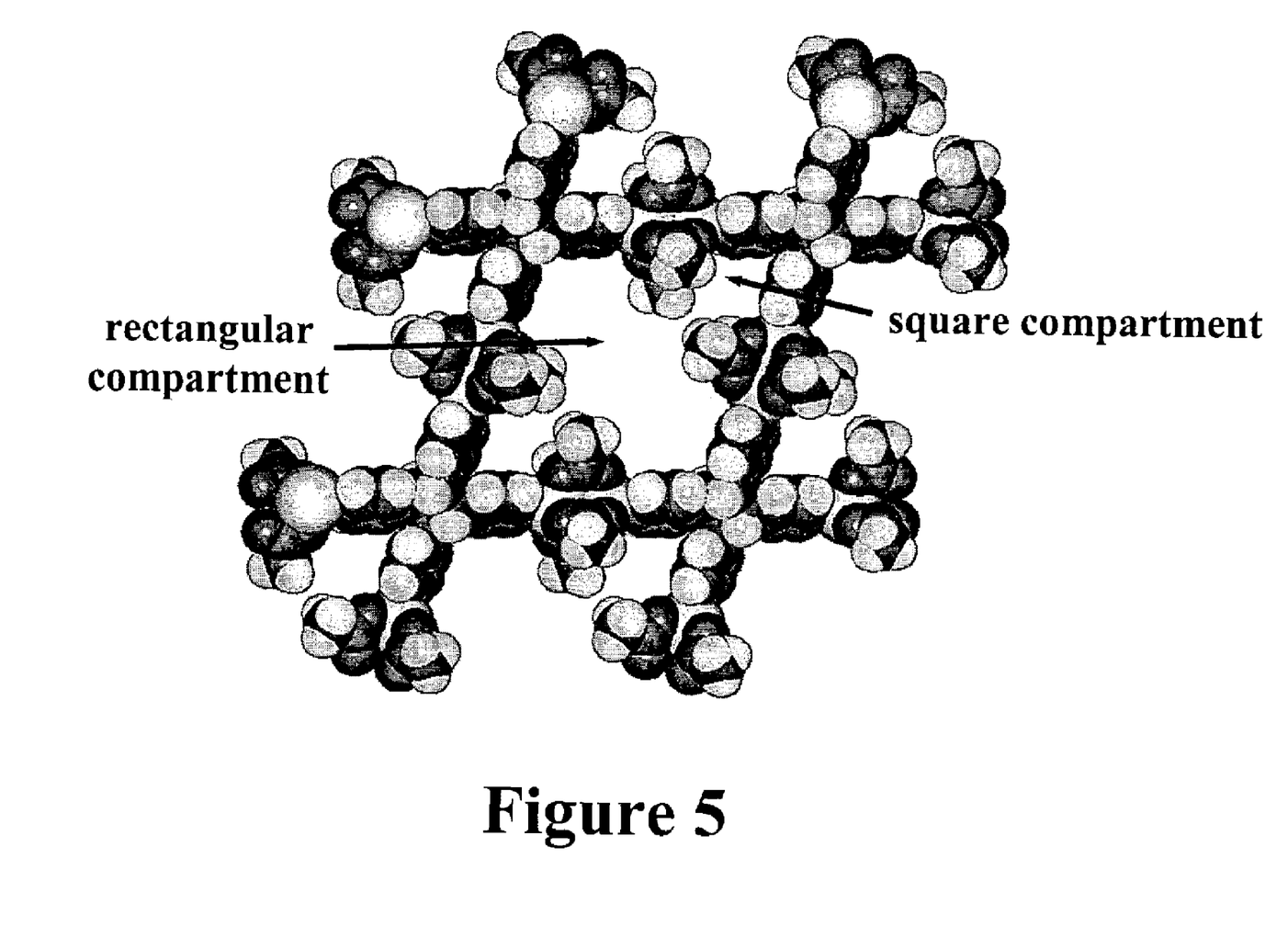
FIG. 5. A space-filling view of the rhombic cavity of 1. The cavity is subdivided by organic functional groups stemming from the SBU to form one rectangular or two square compartments.
Figure 6A:
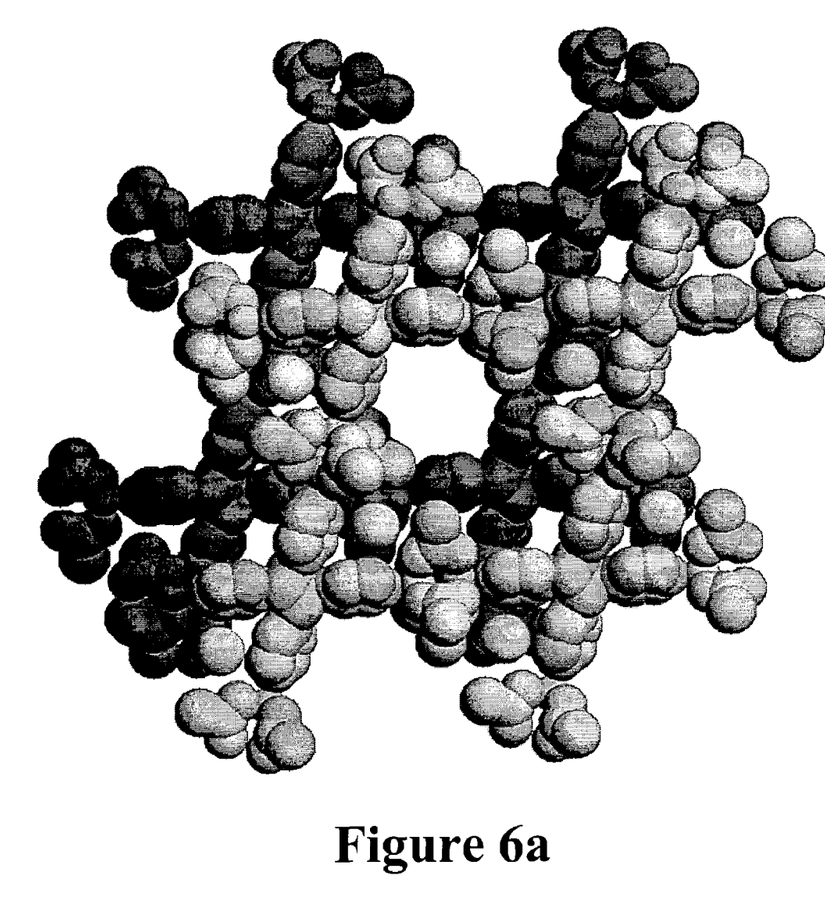
FIG. 6. Space-filling views that demonstrate the stacking of the grids of 1 that form 1D channels and enable guest inclusion: a) stacking of two grids showing the inclusion of methyl groups, or "pegs", within the square compartments (hydrogen atoms omitted for clarity), b) the 1D elliptical channels that arise from stacking of the larger compartments, and c) the ordered and disordered benzene guests.
Figure 6B:
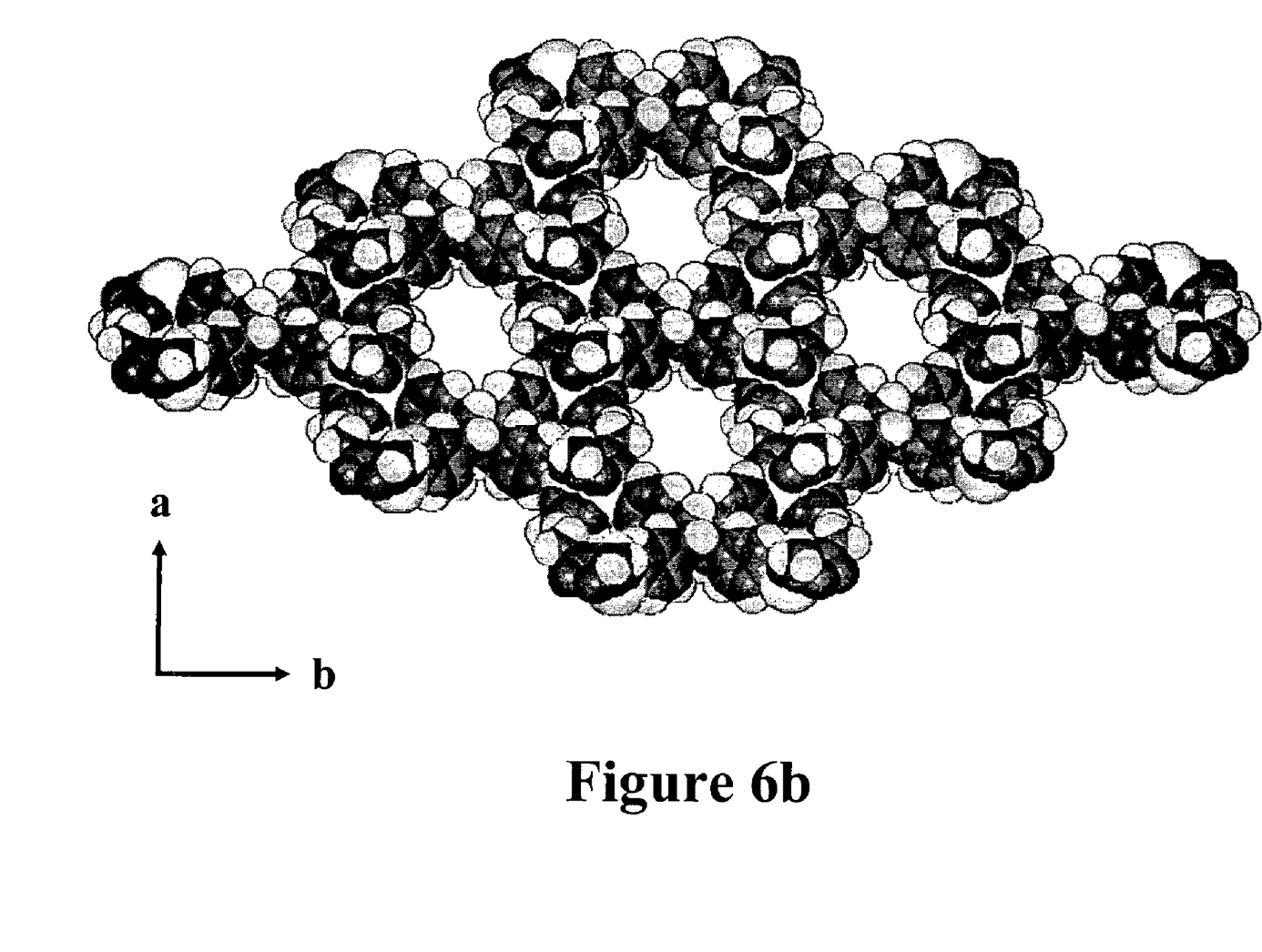
Figure 6C:
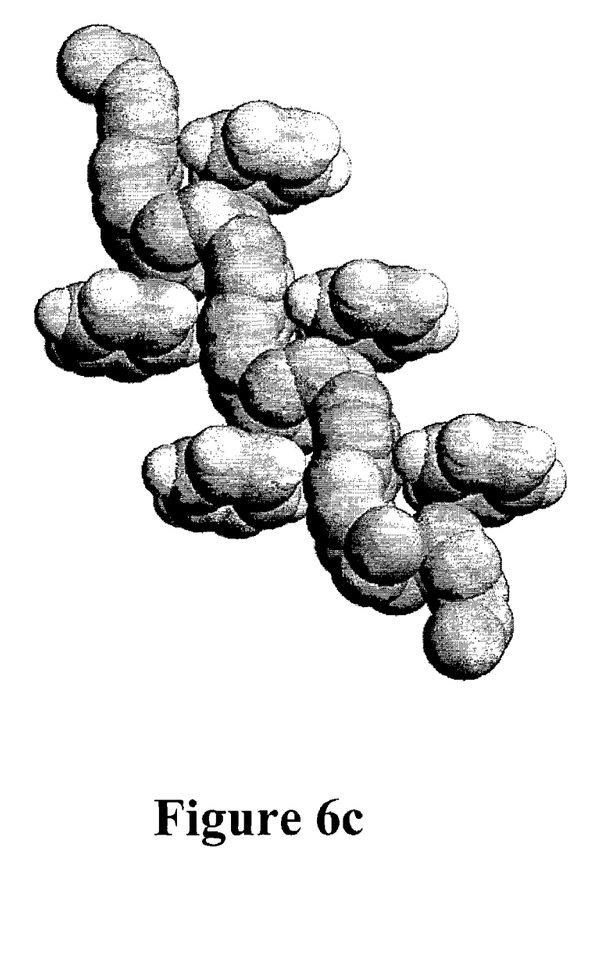

The cavities of 1, unlike those metal-bipyridine grids (B. Moulton, M. J. Zaworotko, *Chem. Rev.* 2001, 101, 1629-1658; P. J. Hagrman, et al., *Angew. Chem.* 1999, 111, 2798-2848; *Angew. Chem. Int. Ed. Engl.* 1999, 38, 2638-2684), are decorated with convergent organic functional groups; four methyl groups are directed into the rhombic cavities such that the ligands subdivide each cavity into three compartments (FIG. 5). The largest compartment, which defines a large rectangular box of dimensions of about 20.0×9.5×5.0 Å, runs along the diagonal of the obtuse corner angles and is occupied by one ordered and two disordered benzene guests. The two smaller compartments, which define moderately-sized square boxes of dimensions of about 7.0×7.0×5.0 Å, are located in the remaining corners and are filled by methyl groups, directed above and below each cavity, of adjacent grids. (For perspective, the smaller square cavities are comparable in size to the cavities of Fe(pyrazine)$_2$(NCS)$_2$, see: J. A. Real, et al., *Inorg. Chem.* 1991, 30, 2701-2704.) As depicted in FIG. 6, the inclusion of the methyl groups (FIG. 6a) results in oblique stacking of the grids (interlayer separation: 5.7 Å) along the crystallographic c-axis which, in turn, gives rise to a porous 3D MOF with, in a similar way to MCM-41 (Selvam, et al., *Ind. Eng. Chem. Res.* 2001, 40, 3237-3261) (MCMs are readily functionalized with organic groups by post-synthetic graphting, see: M. H. Lim, et al., *J. Am. Chem. Soc.* 1997, 119, 4090-4091), isolated 1D channels, of dimensions of about 12×10 Å (FIG. 6b). The channels are occupied by ordered (one per cavity) and disordered (two per cavity) benzene solvent molecules, which assemble edge-to-face (FIG. 6c), and represent about 40% of the volume of the unit cell (P. van der Sluis, A. L. Spek, *Acta. Crystallogr., Sect. A* 1990, A46, 194-201). Thus, the organic functional groups of the SBU accommodate the methyl groups as 'pegs' in lining up the layers, preorganizing the grids to form the channels. To our knowledge, such molecular compartmentalization within a MOF has not been realized (For a metal-organic cage that exhibits molecular compartments, see: P. N. W. Baxter, et al., *Angew. Chem.* 1993, 105, 92-95; *Angew. Chem. Int. Ed. Engl.* 1993, 32, 89-90; P. N. W. Baxter, et al., *Chem. Eur. J.* 1999, 5, 102-112. For an organic cage that exhibits molecular compartments, see: D. M. Rudkevich, et al., *J. Org. Chem.* 1995, 60, 6585-6587).

Thermagravimetric (TGA) and differential scanning calorimetry (DSC) analysis, along with X-ray powder diffraction and optical microscopy, suggest that the structure of 1 is maintained between 27° C. and 180° C. During this temperature change, the guest is liberated in two mass losses at 27° C. (two guests) and 75° C. (one guest), which may be attributed to the disordered and ordered guests (D. Venkataraman, et al., *J. Am. Chem. Soc.* 1995, 117, 11600-11601), respectively, for which DSC and optical microscopy indicate no evidence of a phase change. Moreover, although diffraction-peak broadening is observed with the increase in temperature, single-crystal X-ray analysis performed on a sample after removal of the guest confirms the structure of 1, the framework being virtually identical to guest-filled 1 save for high thermal motion of the organic components. (The rhombic cavity of the heated sample of 1 displays cavity dimensions of about 17.1×17.1× 5.0 Å and corner angles of about 72° and 108°. The slight deformation in shape of the cavities results in a lowering in symmetry of the unit cell to the triclinic setting.) Indeed, 1 is a rare example of a MOF with single crystals stable to guest removal (D. Venkataraman, et al., *J. Am. Chem. Soc.* 1995, 117, 11600-11601; C. J. Kepert, M. J. Rosseinsky, *Chem. Commun.* 1999, 375-376; K. Biradha, et al., *Angew. Chem.* 2000, 112, 4001-4003; *Angew. Chem. Int. Ed. Engl.* 2000, 39, 3843-3845). Preliminary results reveal that reintroduction of benzene can be achieved by placing 1 in neat benzene and heating the solvent to approximately 70° C. Notably, guest uptake is accompanied by further diffraction-peak broadening which may be attributed to additional disorder of the organic groups. The additional peak broadening due to reintroduction of the guest precludes a single-crystal structure determination of 1. Heating beyond 180° C. results in decomposition of the solid.

Example 2

Compound 2.2-benzene

Using a procedure similar to that described in Example 1, except replacing the [Cu(O$_2$CCH$_3$)$_2$(H$_2$O)$_2$] used therein with [Cu(O$_2$CC(CH$_3$)=CH$_2$)$_2$(H$_2$O)$_2$], a framework of the invention (Compound 2.2benzene) was prepared. The framework was characterized by X-ray crystallographic analysis and found to have cavities of approximately 17.2×17.2×5.0 Å, with the unsaturated acrylate bonds directed into the cavities.

A strategy for the construction of porous MOFs that enables the supramolecular decoration of cavities with organic functional groups is provided. Lining of the interior is achieved using convergent terminal ligands of a linear SBU and a product of a template-directed solid-state organic synthesis. (See, A. R. Renslo, J. Rebek, Jr., *Angew. Chem.* 2000, 112, 3419-3421; *Angew. Chem. Int. Ed. Engl.* 2000; 39, 3281-3283; K. Choi, A. D. Hamilton, *J. Am. Chem. Soc.* 2001, 123, 2456-2457; M. Eddoudi, et al., *Ace. Chem. Res.* 2001, 34, 319-330; L. R. MacGillivray, *Cryst. Eng. Commun.* 2002, 7, 1-5; G. S. Papaefstathiou, et al., *Chem. Commun.* 2001, 2462-2463; L. R. MacGillivray, et al., *J. Am. Chem. Soc.* 2000, 122, 7817-7818.)

In the present case, the organic functional groups compartmentalize the rhombic cavities of a 2D porous IMOF and preorganize the framework to assemble to form a 3D nanoporous solid. (For a metal-organic cage that exhibits molecular compartments, see: P. N. W. Baxter, et al., *Angew. Chem.* 1993, 105, 92-95; *Angew. Chem. Int. Ed. Engl.* 1993, 32, 89-90; P. N. W. Baxter, et al., *Chem. Eur. J.* 1999, 5, 102-112; for an organic cage that exhibits molecular compartments, see: D. M. Rudkevich, et al., *J. Org. Chem.* 1995, 60, 6585-6587.) That the node has been achieved by a template-directed solid-state organic synthesis (L. R. MacGillivray, *Cryst. Eng. Commun.* 2002, 7, 1-5; G. S. Papaefstathiou, et al., *Chem. Commun.* 2001, 2462-2463; L. R. MacGillivray, et al., *J. Am. Chem. Soc.* 2000, 122, 7817-7818; G. M. J Schmidt, *Pure Appl. Chem.* 1971, 27, 647-678) also suggests that access to MOFs (as in the case of 1) is poorly available or completely inaccessible, in solution, may now be realized. (Such solid-state reactivity has been referred to as latent chemical behavior, see: E. Cheung, et al., *Chem. Commun.* 2000, 2309-2310).

All publications, patents, and patent documents, including G. S. Papaefstathiou, L. R. MacGillivray, *Angew. Chem. Int. Ed.*, 2002, 41, 2070-2073, are incorporated by reference herein, as though individually incorporated by reference. The invention has been described with reference to various specific and preferred embodiments and techniques. However, it should be understood that many variations and modifications may be made while remaining within the spirit and scope of the invention.

We claim:

1. A metal-organic framework comprising bifunctional metallic bridging groups and organic nodes having three or more points of connection, wherein the framework has one or more cavities suitable for containing one or more storage gas molecules.

2. The metal-organic framework of claim 1 wherein each metallic bridging group is linked to organic nodes at two cites.

3. The metal-organic framework of claim 1 wherein each metallic bridging group is linear.

4. The metal-organic framework of any one of claims 1-3 wherein each metallic bridging group comprises a first row transition metal.

5. The metal-organic framework of any one of claims 1-3 wherein each metallic bridging group comprises copper.

6. The metal-organic framework of claim 1 wherein each metallic bridging group is a paddle-wheel complex.

7. The metal-organic framework of claim 1 wherein each metallic bridging group is a compound of the formula [Cu($O_2CR$)($L$)$_2$], wherein R is ($C_1$-$C_6$)alkyl, ($C_2$-$C_6$)alkenyl, ($C_2$-$C_6$)alkynyl, aryl, hydroxy, ($C_1$-$C_6$)alkanoyl, or amino; L is $H_2O$, $R_aOH$, amino, or pyridyl; and $R_a$ is hydrogen, ($C_1$-$C_6$)alkyl, ($C_2$-$C_6$)alkenyl, ($C_2$-$C_6$)alkynyl, aryl, or ($C_1$-$C_6$)alkanoyl.

8. The metal-organic framework of claim 1 wherein each metallic bridging group is independently selected from [Cu($O_2CCH_3$)$_2$($H_2O$)$_2$], [Cu($O_2CCH$=$CH_2$)$_2$($H_2O$)$_2$], [Cu($O_2CC(CH_3)$=$CH_2$)$_2$($H_2O$)$_2$] [Cu($O_2CC$≡$CH$)$_2$($H_2O$)$_2$], and [Cu($O_2CCH_2C$≡$CH$)$_2$($H_2O$)$_2$].

9. The metal-organic framework of claim 1 wherein each organic node is not planar.

10. The metal-organic framework of claim 1 wherein each organic node has three points of connection.

11. The metal-organic framework of claim 1 wherein each organic node has at least four points of connection.

12. The metal-organic framework of claim 1 wherein each organic node has four points of connection.

13. The metal-organic framework of claim 1 wherein each organic node is 1,2,3-tris(4-pyridyl)cyclopropane, bis(4-pyridyl)cyclobutane, tetrakis(4-pyridyl)cyclobutane, pentakis(4-pyridyl)cyclopentane, hexakis(4-pyridyl)cyclohexane, or hexakis(4-pyridyl)benzene.

14. The metal-organic framework of claim 1 wherein each organic node is tetrakis(4-pyridyl)cyclobutane.

15. The metal-organic framework of claim 1 wherein the volume of each cavity is from about 20 cubic angstroms to about 2000 cubic angstroms.

16. The metal-organic framework of claim 1 wherein the volume of each cavity is from about 50 cubic angstroms to about 1000 cubic angstroms.

17. The metal-organic framework of claim 1 which includes organic functional groups directed into, or lining the cavities of the metal-organic framework.

18. The metal-organic framework of claim 17 wherein the organic groups comprise carbon-carbon double bonds or triple bonds.

19. The metal-organic framework of claim 17 wherein the organic groups are capable of reacting with the storage gas to fix the gas within the cavity temporarily.

20. The metal-organic framework of claim 17 wherein the organic groups are capable of reacting with the storage gas to fix the gas within the cavity permanently.

21. The metal-organic framework of claim 1 which includes a metal lining the cavities that is capable of reacting with the storage gas to fix the gas within the cavity.

22. The metal-organic framework of claim 1 which includes metal-organic groups and/or inorganic groups lining the cavities that are capable of reacting with the storage gas to fix the gas within the cavity permanently.

23. The metal-organic framework of claim 1 wherein each linear metallic bridging group is [Cu($O_2CCH_3$)$_2$($H_2O$)$_2$]; and each organic node is tetrakis(4-pyridyl)cyclobutane.

24. The metal-organic framework of claim 1 wherein each linear metallic bridging groups is selected from [Cu($O_2CCH$=$CH_2$)$_2$($H_2O$)$_2$], [Cu($O_2CC(CH_3)$=$CH_2$)$_2$($H_2O$)$_2$] [Cu($O_2CC$≡$CH$)$_2$($H_2O$)$_2$], and [Cu($O_2CCH_2C$≡$CH$)$_2$($H_2O$)$_2$]; and each organic node is tetrakis(4-pyridyl)cyclobutane.

25. The metal-organic framework of claim 1 wherein each linear metallic bridging group is [Cu($O_2CC(CH_3)$=$CH_2$)$_2$($H_2O$)$_2$] and each organic node is tetrakis(4-pyridyl)cyclobutane.

26. The metal-organic framework of claim 1 wherein the storage gas is a mono-atomic gas.

27. The metal-organic framework of claim 1 wherein the storage gas is a di-atomic gas.

28. The metal-organic framework of claim 1 wherein the storage gas is a poly-atomic gas.

29. The metal-organic framework of claim 1 wherein the storage gas is helium, neon, argon, krypton, xenon, or radon.

30. The metal-organic framework of claim 1 wherein the storage gas is hydrogen, oxygen or nitrogen.

31. The metal-organic framework of claim 1 wherein the storage gas is hydrogen.

32. The metal-organic framework of claim 1 wherein the storage gas is methane ethane, propane, butane, or a related halocarbon.

33. The metal-organic framework of claim 1 wherein the storage gas is radioactive.

34. A gas storage cell comprising a metal-organic framework as described in claim 1.

35. A fuel storage cell comprising a metal-organic framework as described in claim 1.

36. A method for storing a gas comprising contacting the metal organic framework of claim 1 with the gas under conditions suitable for the gas to enter the cavities of the framework and be stored.

37. A method for storing a gas comprising contacting the metal organic framework of claim 17, with the gas under conditions suitable for the gas to enter the cavities of the framework and react with the organic groups so as to become fixed to the organic groups.

38. A method for preparing a metal-organic framework as described in claim 1 comprising reacting metallic bridging groups and organic nodes having three or more possible points of connection in a suitable solvent to provide the metal-organic framework.

39. A metal-organic framework comprising bifunctional metallic bridging groups and organic nodes having three or more points of connection, wherein
   the framework has one or more cavities suitable for containing one or more storage gas molecules; and
   each metallic bridging group comprises copper; and
   each organic node is 1,2,3-tris(4-pyridyl)cyclopropane, bis(4-pyridyl)cyclobutane, tetrakis(4-pyridyl)cyclobutane, pentakis(4-pyridyl)cyclopentane, hexakis(4-pyridyl)cyclohexane, or hexakis(4-pyridyl)benzene; and
   the volume of each cavity is from about 20 cubic angstroms to about 2000 cubic angstroms.

40. The metal-organic framework of claim 39 which includes organic functional groups directed into, or lining the cavities of the metal-organic framework, wherein the organic groups are capable of reacting with the storage gas to fix the gas within the cavity permanently.

41. The metal-organic framework of claim 39 or 40, wherein the storage gas is helium, neon, argon, krypton, xenon, or radon.

* * * * *